United States Patent
Kujiraoka (10) Patent No.: US 9,481,188 B2
(45) Date of Patent: Nov. 1, 2016

(54) LIQUID DROPLET EJECTING APPARATUS AND LIQUID DROPLET EJECTING METHOD

(71) Applicant: Seiko Epson Corporation, Tokyo (JP)

(72) Inventor: Yoichi Kujiraoka, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/062,793

(22) Filed: Mar. 7, 2016

(65) Prior Publication Data

US 2016/0279985 A1    Sep. 29, 2016

(30) Foreign Application Priority Data

Mar. 27, 2015   (JP) ................. 2015-065920

(51) Int. Cl.
    *B41J 2/21*    (2006.01)
    *B41J 25/00*   (2006.01)
    *G06K 15/10*   (2006.01)

(52) U.S. Cl.
    CPC ............ *B41J 25/006* (2013.01); *G06K 15/107* (2013.01)

(58) Field of Classification Search
    CPC .. B41J 2/2132; B41J 29/393; B41J 2/04501; B41J 2/2135; B41J 2/145; G06K 15/107; H04N 1/1911; H04N 1/1913
    See application file for complete search history.

(56) References Cited

U.S. PATENT DOCUMENTS 6,601,939 B2 *  8/2003  Fujita ................. G06K 15/107
                                                347/15
2010/0277521 A1  11/2010  Kaneko et al.

FOREIGN PATENT DOCUMENTS

WO   WO-2009-093749 A1   7/2009

* cited by examiner

*Primary Examiner* — Thinh Nguyen
(74) *Attorney, Agent, or Firm* — Harness, Dickey & Pierce, P.L.C.

(57) ABSTRACT

A liquid droplet ejecting apparatus executes multi-pass recording constituted of N scan passes including a scan pass for an outward path and a scan pass for a return path (N being an integer of 2 or more). When a proportion of executions of dot recording using a first liquid in each scan pass is made a first recording ratio, and a proportion of executions of dot recording using a second liquid in each pass is made a second recording ratio, the first recording ratio and the second recording ratio are set such that, in a first half of the N scan passes, a total ratio of the first recording ratio is larger than a total ratio of the second recording ratio, and in a second half of the N scan passes, a total ratio of the second recording ratio is larger than a total ratio of the first recording ratio.

5 Claims, 9 Drawing Sheets

LIQUID DROPLET EJECTING APPARATUS AND LIQUID DROPLET EJECTING METHOD

BACKGROUND

1. Technical Field

The present invention relates to a liquid droplet ejecting apparatus that ejects liquid droplets onto the surface of a medium, and a liquid droplet ejecting method therefor.

2. Related Art

A typical example of liquid droplet ejecting apparatuses is an ink jet printing apparatus. In International Publication No. WO2009/093749, there is described a technology for making a mask pattern that determines the proportion of ejections of a yellow ink (a specific ink) variable in order to suppress the deviation of the frequency of use regarding nozzles. In International Publication No. WO2009/093749, it is also mentioned that, when bidirectional printing is performed, the change of ejection order of inks also changes the coloring method, thereby causing color unevenness.

Meanwhile, heretofore, with respect to the suppression of such color unevenness that arises due to the change of ejection order of inks, further improvements have been desired. Further, in liquid droplet ejecting apparatuses other than the ink jet printing apparatus, there has been a similar problem on liquid evenness that arises due to the change of ejection order of plural kinds of liquid droplets.

SUMMARY

The invention can be realized in the following aspects or application examples.

(1) According to an aspect of the invention, there is provided a liquid droplet ejecting apparatus including a recording head that includes a first nozzle set through which a first liquid is ejected onto a dot recording medium, and a second nozzle set through which a second liquid different from the first liquid is ejected onto the dot recording medium; a scanning driving portion that performs bidirectional scanning for an outward path and a return path by moving at least one of the dot recording medium and the recording head; and a control portion that controls the scanning driving portion and the recording head. In this liquid droplet ejecting apparatus, the control portion executes multi-pass recording that completes dot recording on each of a plurality of scanning lines by executing N scan passes including a scan pass for the outward path and a scan pass for the return path (N being an integer of 2 or more), and when a proportion of executions of dot recording using the first liquid in each of the N scan passes is made a first recording ratio, and a proportion of executions of dot recording using the second liquid in each of the N scan passes is made a second recording ratio, the control portion sets the first recording ratio and the second recording ratio such that, in a first half of the N scan passes, a total ratio of the first recording ratio is larger than a total ratio of the second recording ratio, and in a second half of the N scan passes, a total ratio of the second recording ratio is larger than a total ratio of the first recording ratio.

According to the above liquid droplet ejecting apparatus, in the first half of the N scan passes, a total ratio of the first recording ratio regarding the first liquid is set to become large, and in the second half of the N scan passes, a total ratio of the second recording ratio regarding the second liquid is set to become large, thus making it possible to, even when the ejection order of the first liquid and the second liquid is changed, suppress the occurrence of liquid unevenness due to the change of the ejection order of the first liquid and the second liquid.

(2) In the above liquid droplet ejecting apparatus, the control portion may set a value of the first recording ratio of each of the N scan passes to a corresponding one of N first fixed values among which at least one difference exists, and may set a value of the second recording ratio of each of the N scan passes to a corresponding one of N second fixed values among which at least one difference exists.

According to this configuration, each of the first recording ratio regarding the first liquid and the second recording ratio regarding the second liquid on each of the scanning lines is changed at least once of the N scan passes, thus making it possible to, even when the ejection order of the first liquid and the second liquid is changed, suppress the occurrence of liquid unevenness due to the change of the ejection order of the first liquid and the second liquid.

(3) In the above liquid droplet ejecting apparatus, the N may be made an integer of 3 or more; the recording head may further include a third nozzle set through which a third liquid different from the first liquid and the second liquid is ejected onto the dot recording medium; and when a proportion of executions of dot recording using the third liquid in each of the N scan passes is made a third recording ratio, the control portion may set a value of the third recording ratio of each of the N scan passes to a corresponding one of N third fixed values among which at least one difference exists. At this time, when the N scan passes performed by the recording head is time-serially divided into a firstly-executed scan pass group, a secondly-executed scan pass group, and a thirdly-executed scan pass group, the control portion may set the first recording ratio, the second recording ratio, and the third recording ratio such that, in the firstly-executed scan pass group, a total ratio of the first recording ratio is larger than any one of a total ratio of the second recording ratio and a total ratio of the third recording ratio, in the secondly-executed scan pass group, a total ratio of the third recording ratio is larger than any one of a total ratio of the first recording ratio and a total ratio of the second recording ratio, and in the thirdly-executed scan pass group, a total ratio of the second recording ratio is larger than any one of a total ratio of the first recording ratio and a total ratio of the third recording ratio.

According to this configuration, with respect to the N scan passes, in the firstly-executed scan pass group, a total ratio of the first recording ratio regarding the first liquid is set to become large; in the secondly-executed scan pass group, a total ratio of the third recording ratio regarding the third liquid is set to become large; and in the thirdly-executed scan pass group, a total ratio of the second recording ratio regarding the second liquid is set to become large, thus making it possible to, even when the ejection order of the first, second, and third liquids is changed, suppress the occurrence of liquid unevenness due to the change of the ejection order thereof.

(4) In the liquid droplet ejecting apparatus, the first liquid and the second liquid may be made a cyan ink and a magenta ink, respectively, or may be made a magenta ink and a cyan ink, respectively, and the third liquid may be made a yellow ink.

According to this configuration, it is possible to suppress the occurrence of color unevenness regarding three chromatic color inks, that is, the cyan ink, the magenta ink, and the yellow ink.

The invention can be realized in various forms, such as a liquid droplet ejecting apparatus; a liquid droplet ejecting method; a computer program for realizing the functions of the liquid droplet ejecting apparatus or the liquid droplet ejecting method; and a non-transitory storage medium for storing the computer program therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
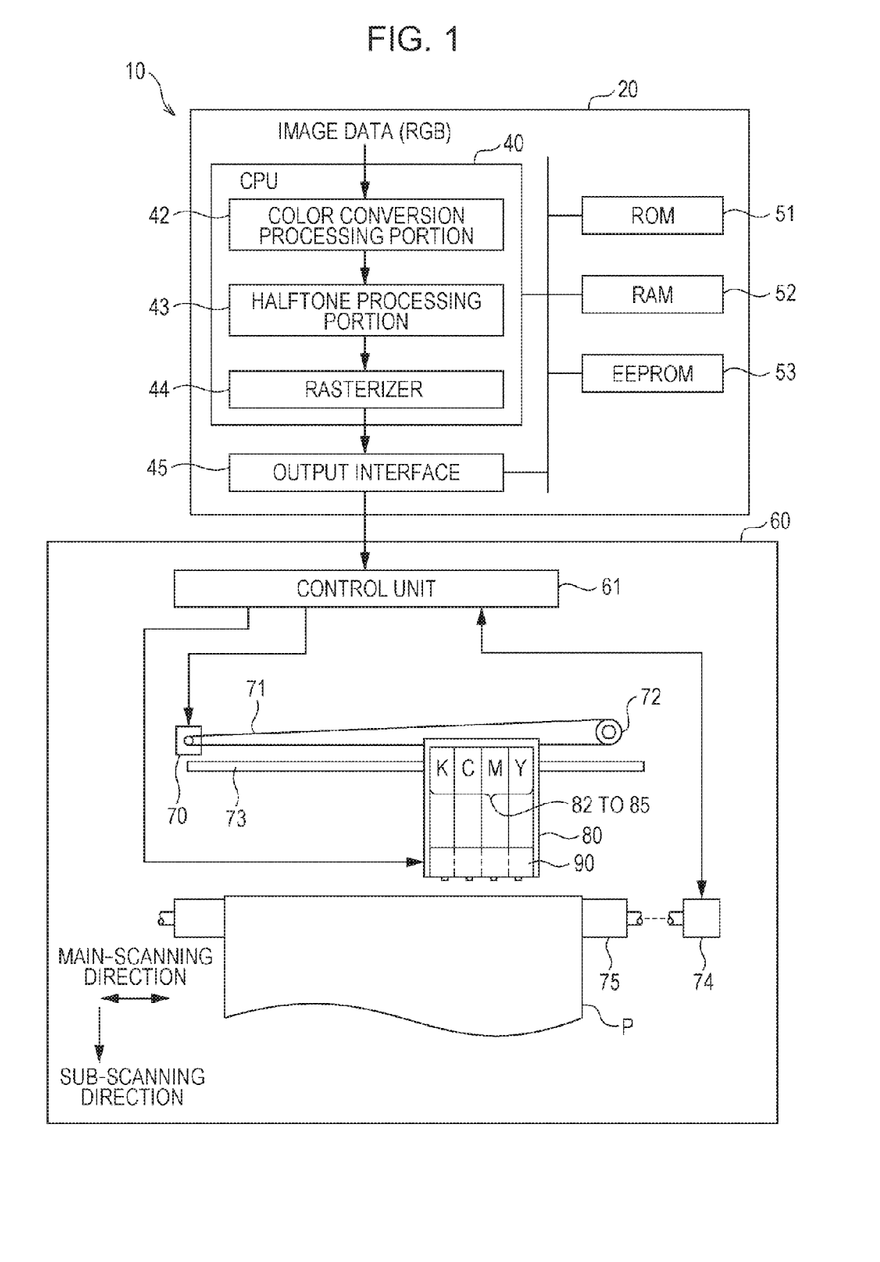
FIG. 1 is an explanatory diagram illustrating a configuration of a liquid ejecting system.

FIG. 1 is an explanatory diagram illustrating a configuration of a liquid ejecting system according to a first embodiment of the invention. A liquid ejecting system 10 shown in FIG. 1 includes an image processing unit 20 and a liquid ejecting apparatus 60. The image processing unit 20 generates a set of dot recording data that represents dot-recording states for use in the liquid ejecting apparatus 60, from a set of image data (for example, a set of RGB image data). The liquid ejecting apparatus 60 can be realized as, for example, a printing apparatus that performs printing by electing liquid droplets onto printing paper. Hereinafter, mainly, a case where the liquid ejecting apparatus 60 is such a printing apparatus will be described. In addition, a set of dot recording data that is supplied to the liquid ejecting apparatus 60 from the image processing unit 20 may be also referred to as "a set of printing data" or "a set of raster data".

The image processing unit 20 includes a control portion 40 provided with a CPU; a ROM 51; a RAM 52; an EEPROM 53; and an output interface 45. The control portion 40 includes three functional portions: a color conversion processing portion 42; a halftone processing portion 43; and a rasterizer 44. The functions of these functional portions are realized by a computer program. The color conversion processing portion 42 converts multi-grayscale-level RGB image data into ink-amount data representing ink amounts of a plurality of kinds of color inks. The halftone processing portion 43 generates dot data representing dot formation states of individual dots by performing halftone processing on the ink-amount data. The rasterizer 44 rearranges the dot data having been generated by the halftone processing into dot data for use in individual main-scanning operations by the liquid ejecting apparatus 60. Hereinafter, the dot data for use in the individual scanning operations, having been generated by the rasterizer 44, is referred to as "raster data". Further, dot recording operation described below is rasterizing operation realized by the rasterizer 44 (i.e., operation represented by the raster data). In addition, the image processing unit 20 may be configured so as to be integrated with the liquid ejecting apparatus 60.

The liquid ejecting apparatus 60 is, for example, a serial ink jet printing apparatus, and includes a control unit 61 for controlling individual portions inside the liquid ejecting apparatus 60; a carriage motor 70; a driving belt 71; a pulley 72; a sliding shaft 73; a paper transport motor 74; a paper transport roller 75; a carriage 80; ink cartridges 82 to 85; and a recording head 90.

The sliding belt 71 is stretched between the carriage motor 70 and the pulley 72. The carriage 80 is attached to the shifting belt 71. In the carriage 80, the ink cartridges 82 to 85 each containing a corresponding one of, for example, a black ink (K), a cyan ink (C), a magenta ink (M), and a yellow ink (Y) are mounted. These four kinds of inks may be also referred to as a "K ink", a "C ink", an "M ink", and a "Y ink" hereinafter. In addition, as the inks, various kinds of inks other than these examples may be employed. Further, in the recording head 90 that is disposed in a lower portion of the carriage 80, nozzle rows corresponding to the above individual color inks are formed. Upon attachment of the cartridges 82 to 85 to the carriage 80, it becomes possible to supply the inks to the recording head 90 from the individual cartridges. The sliding shaft 73 is disposed parallel to the driving belt 71, and is configured so as to pass through the carriage 80.

When the carriage motor 70 drives the driving belt 71, the carriage 80 moves along the sliding shaft 73. The direction of this movement is referred to as a "main-scanning direction" hereinafter. The carriage motor 70, the driving belt 71, and the sliding shaft 73 constitute a main-scanning driving mechanism (hereinafter, also referred to as a "main-scanning driving portion" or merely a "scanning driving portion"). The ink cartridges 82 to 85 and the recording head 90 also move in the main-scanning direction in conjunction with the movement of the carriage 80 in the main-scanning direction. During this movement in the main-scanning direction, the inks are ejected onto a recording medium P (typically, printing paper) through nozzles (described below) that are disposed in the recording head 90, and thereby dot recording onto the recording medium P is performed. Hereinafter, such movement of the recording head 90 in the main-scanning direction and ejection of the inks from the recording head 90 may be referred to as main scanning operation, and one scanning operation may be referred to as a "main scan pass", or may be also referred to as a "scan pass" or a "pass".

The paper transport roller 75 is mechanically connected to the paper transport motor 74. During a printing operation, the recording paper P is inserted onto the paper transport roller 75. When the carriage 80 has moved to an edge portion in the main-scanning direction, the control unit 61 causes the paper transport motor 74 to rotate. Through this operation, the paper transport roller 75 also rotates and this rotation causes the recording medium P to move. A direction in which the recording medium P moves relatively to the recording head 90 is referred to as a "sub-scanning direction" hereinafter. The paper transport motor 74 and the paper transport roller 75 constitute a sub-scanning mechanism (also referred to as a "sub-scanning driving portion"). The sub-scanning direction is a direction perpendicular to (orthogonal to) the main-scanning direction. In this regard, however, the main-scanning direction and the sub-scanning direction are not necessarily orthogonal to each other, and are sufficient provided that the main-scanning direction and the sub-scanning direction intersect with each other. In addition, normally, a main-scanning operation and a sub-scanning operation are alternately executed. Further, as dot recording operation, it is possible to selectively perform one of two kinds of recording operations: one being a unilateral recording operation (so-called unilateral printing) in which dot recording is performed in only a main-scanning operations for an outward path; the other one being a bilateral recording operation (so-called bidirectional printing) in which dot recording is performed in each of both a main-scanning operation for an outward path and a main-scanning operation for a return path.

Figure 2:
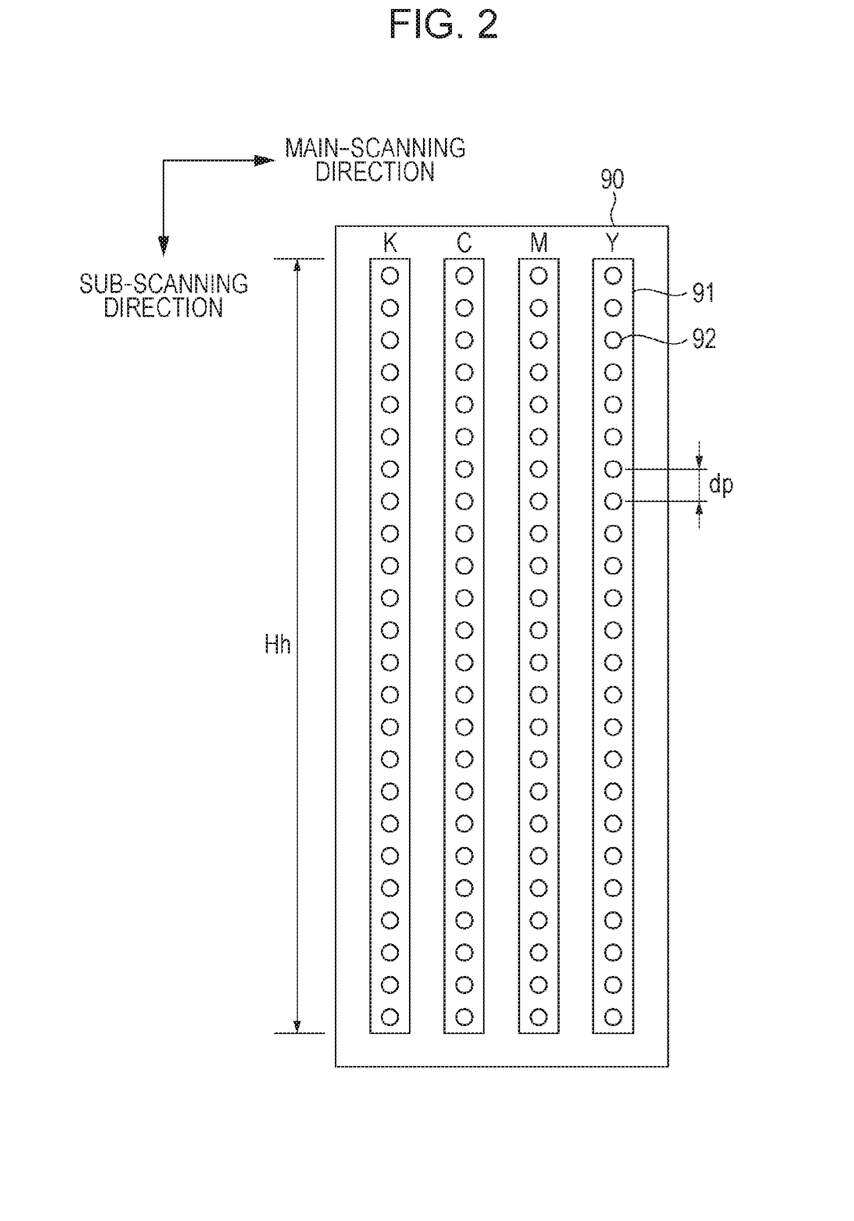
FIG. 2 is an explanatory diagram illustrating an example of the configuration of nozzle rows of a recording head.

FIG. 2 is an explanatory diagram illustrating an example of the configuration of nozzle rows of the recording head 90. The recording head 90 is provided with one nozzle row 91 for each kind of ink. Each nozzle row 91 includes a plurality of nozzles 92 that are arranged in the sub-scanning direction at intervals of a constant nozzle pitch dp. The plurality of nozzles 92 corresponding to each color may be also referred to as a "nozzle set" hereinafter. In addition, in the following embodiment described below, the nozzle pitch dp is equal to a pixel pitch on the recording medium P. In this regard, however, it is possible to make the nozzle pitch dp equal to several integer times the pixel pitch on the recording medium P. In the latter case, so-called interlace recording is performed. This interlace recording is a recording operation in which dot recording is performed during each of second and subsequent passes so as to fill in dot-to-dot spaces between every two adjacent ones of main-scanning lines on which dot recording has been performed during a first pass. The nozzle pitch dp has a value of, for example, 0.035 mm, which is equivalent to 720 dpi. Through one main scan pass, dots corresponding to the individual kinds of inks can be recorded on an area having a width equal to a head height Hh. Here, the "head height Hh" means a sub-scanning direction length that is represented by "M×dp" (M being a total number of nozzles provided in one nozzle row 91, and dp being a nozzle pitch).

Figure 3:
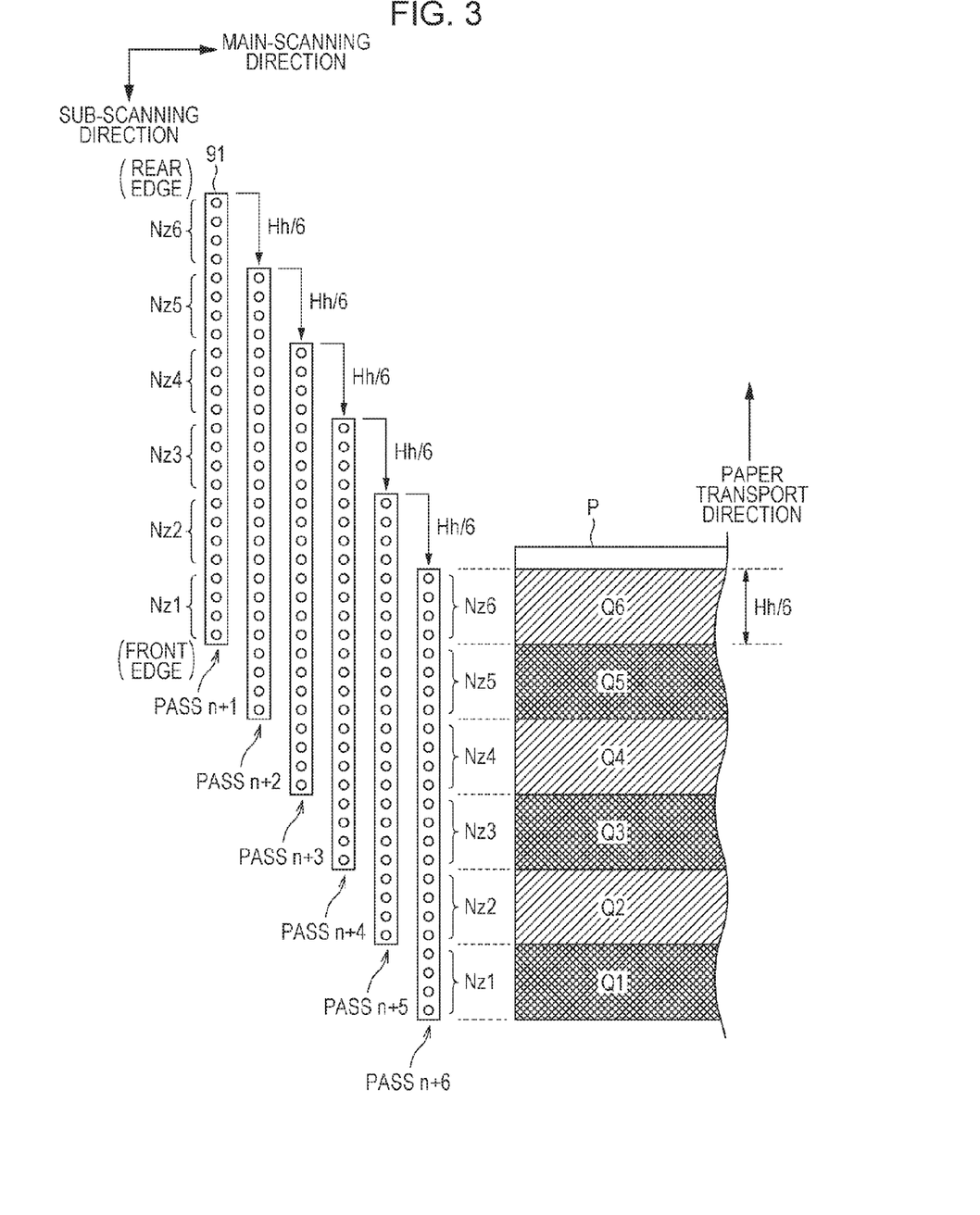
FIG. 3 is an explanatory diagram illustrating the states of main scan passes in a first embodiment of the invention.

FIG. 3 is an explanatory diagram illustrating the states of main scan passes in this first embodiment. Here, there is illustrated a state in which one nozzle row 91 sequentially shifts in the sub-scanning direction every time one main scan pass is executed. In this example, the formation of dots on each of the main scanning lines is completed through six main scan passes. In this patent description, generally, dot recording operation in which the formation of dots on each of the main scanning lines is completed through N main scan passes (N being an integer of 2 or more) is called "multi-pass recording". In FIG. 3, a nozzle row 91 denoted by characters "PASS n+1" indicates the position of the nozzle row 91 during a 1st one of the six main scan passes, and a nozzle row 91 denoted by characters "PASS n+2" indicates the position of the nozzle row 91 during a 2nd one of the six main scan passes. Here, "n" is an integer of 0 or more, and is a parameter that is incremented by one every time the six scan passes are completed and updated. In addition, in this embodiment, the main-scanning operation is performed bi-directionally. For example, an odd number-th main scan pass is performed on an outward path and an even number-th main scan pass is performed on a return path. In the following description, an (n+j)th main scan pass (j being one of integers 1 to 6) may be also referred as merely a "pass j".

Every time one main scan pass is performed, the position of the nozzle row 91 sifts in the sub-scanning direction by a distance corresponding to 1/N of the head height Hh. This distance Hh/N is referred to as a "sub-scanning transport amount" hereinafter. In the example shown in FIG. 3, since N=6, the sub-scanning transport amount is equal to Hh/6. In addition, in this embodiment, actually, the sub-scanning operation is performed in conjunction with sequential transport of the recording medium P in a paper transport direction (in an upward direction in FIG. 3) in a state in which the nozzle row 91 remains stationary. In this regard, however, in FIG. 3, for the convenience of illustration, the diagram is drawn on the assumption that the recording medium P remains stationary and the nozzle row 91 moves downward. At this time, a direction in which the nozzle row 91 moves corresponds to the sub-scanning direction opposite the paper transport direction. In addition, among portions of the nozzle row 91, a first portion that reaches the recording medium P earlier than any other one of the portions is referred to as a "front edge" of the nozzle row 91 hereinafter, and a second portion opposite the first portion is referred to as a "rear edge" of the nozzle row 91 hereinafter. The whole length of the nozzle row 91 can be sectioned into N nozzle groups from the front-edge side toward the rear-edge side on a virtual basis, and in this embodiment, since N=6, the whole length of the nozzle row 91 is sectioned into six nozzle groups Nz1 to Nz6.

Further, six areas Q1 to Q6 shown on the recording medium P are areas on each of which dot recording is sequentially performed by each of the nozzle groups Nz1 to Nz6 of the nozzle row 91. Among the areas Q1 to Q6, the area Q6 located in a top portion is subjected to dot recording by a 1st nozzle group Nz1 during a pass 1. In this regard, however, during one pass, dots are not recorded on all pixel positions included in the area Q6, but are recorded in accordance with a preset recording proportion (described below). Further, during a next pass 2, the area Q6 is subjected to dot recording by a 2nd nozzle group Nz2, and similarly, in each of passes 3 to 6, the area Q6 is subjected to dot recording by a corresponding one of nozzle groups from a 3rd nozzle group Nz3 to a 6th nozzle group Nz6. Upon completion of these six passes, dot recording on all pixel positions within the area Q6 is completed. Similarly, with respect to each of the other areas Q1 to Q5 and other areas located below the area Q1, dot recoding is competed upon completion of six passes. The height (the sub-scanning direction height) of each of the areas Q1 to Q6 is equal to Hh/6, and generally, the height of each of areas Q1 to QN is equal to Hh/N (N being a total pass number in multi-pass recording). Hereinafter, each of the areas Q1 to Q6 may be also referred to as a "band area".

In addition, here, it is assumed a case where an image is formed on the recording medium P such that a dot is formed on each of all pixel positions on the recording medium P, that is, it is assumed a case where a solid image is formed on the recording medium P, but, an actual recording image (a printing image) represented by dot recording data includes pixel positions on each of which, actually, a dot is formed and pixel positions on each of which, actually, no dot is formed. That is, it is determined whether or not a dot is actually formed on each of pixel positions on the recording medium P, on the basis of dot data generated by halftone processing. In this patent description, the term "dot recording" means "execution of formation or non-formation of a dot or dots". Further, the term "perform dot recording" has no relation with whether or not each of dots is actually formed on the recording medium P, and is used as a term that means "handle dot recording".

Figure 4:
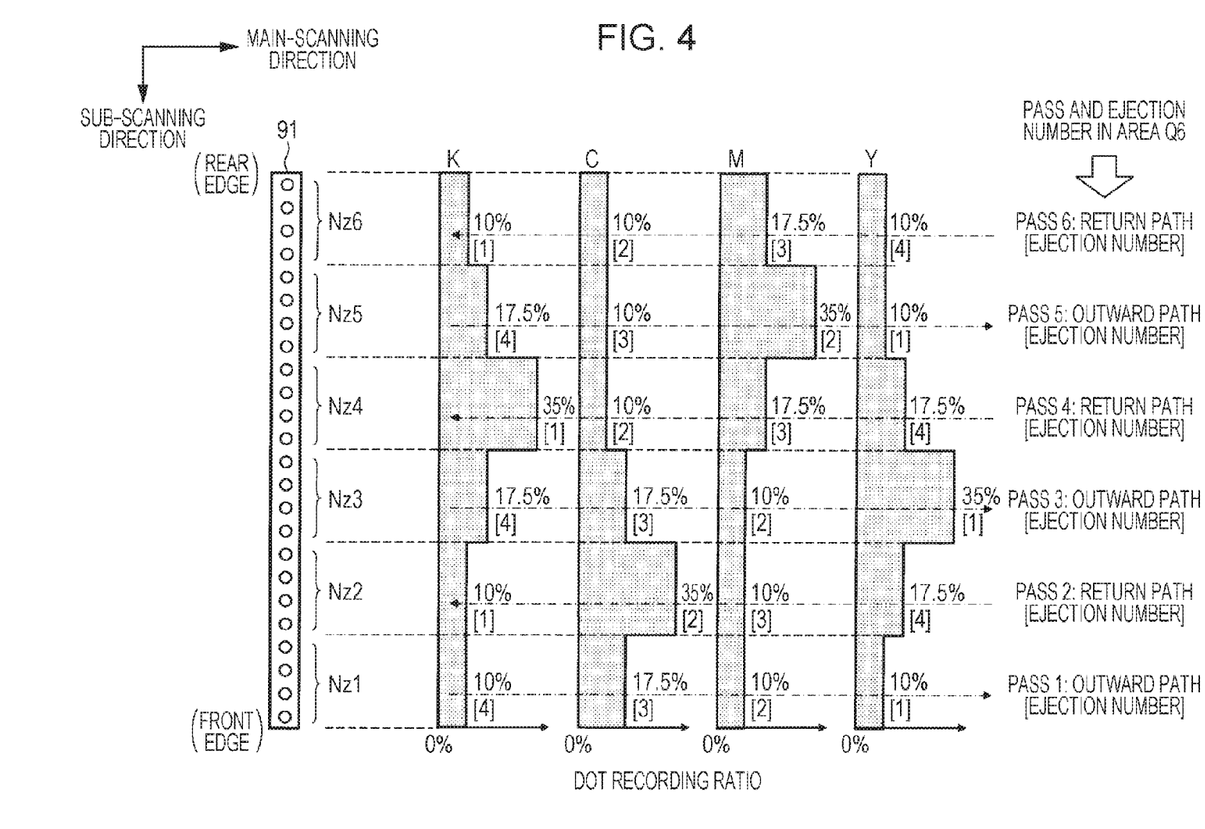
FIG. 4 is an explanatory diagram illustrating dot recording ratios that are set to nozzle rows each associated with a corresponding one of inks.

FIG. 4 is an explanatory diagram illustrating dot recording ratios each being set to a corresponding one of the plurality of nozzle groups Nz1 to Nz6 that are included in each of four nozzle rows 91, which ejects a corresponding one of four kinds of inks. Here, the "dot recording ratio" means a proportion of pixel positions on which dot recording using nozzles belonging to a nozzle group corresponding to the relevant dot recording ratio is performed during one main scan pass (that is, the "dot recording ratio" means a proportion of executions of dot recording).

For example, when the dot recording ratio is 10%, dot recording is performed (that is, the formation or non-formation of dots is executed) on pixel positions corresponding to 10% of pixel positions above which nozzles belonging to a nozzle group corresponding to the relevant dot recording ratio pass during one pass.

For each of the four kinds of inks, dot recording ratios each associated with a corresponding one of the six nozzle groups Nz1 to Nz6 are not set to a constant value, but are each set to a corresponding one of values among which a plurality of differences exist. For example, with respect to the K ink, the dot recording ratios of the respective six nozzle groups Nz1 to Nz6 are set to 10%, 10%, 17.5%, 35%, 17.5%, and 10% in order from the nozzle group Nz1 toward the nozzle group Nz6. With respect to each of the other kinds of inks, the dot recording ratios of the respective six nozzle groups Nz1 to Nz6 are set in the same way. In this regard, however, for the four kinds of inks, three kinds of identical fixed values (10%, 17.5%, and 35%) are used, but the arrangement order thereof regarding each of the four kinds of inks is different from that regarding any other one of the four kinds of inks. By the way, as understood from FIG. 3, for any one of the four kinds of inks, dot recording onto the band area Q6 is performed by the 1st nozzle group Nz1 during the pass 1, and similarly, the dot recording onto the band area Q6 is performed by each of nozzle groups from the 2nd nozzle group Nz2 to the 6th nozzle group Nz6 by a corresponding one of the passes 2 to 6. Accordingly, for example, with respect to the K ink, the total proportion of executions of dot recording onto the band area Q6 through the six passes is equal to the total ratio of the dot recording ratios of the respective six nozzle groups Nz1 to Nz6, and the dot recording ratios of the respective six nozzle groups Nz1 to Nz6 are set such that the total ratio of the relevant dot recording ratios becomes 100%. It is equivalent to an event in which dot recording is performed onto every pixel position that the total ratio of the dot recording ratios is equal to 100%. With respect to any other one of the four kinds of inks, similarly, the dot recording ratios of the respective six nozzle groups Nz1 to Nz6 are set such that the total ratio of the relevant dot recording ratios becomes equal to 100%.

Figure 5:
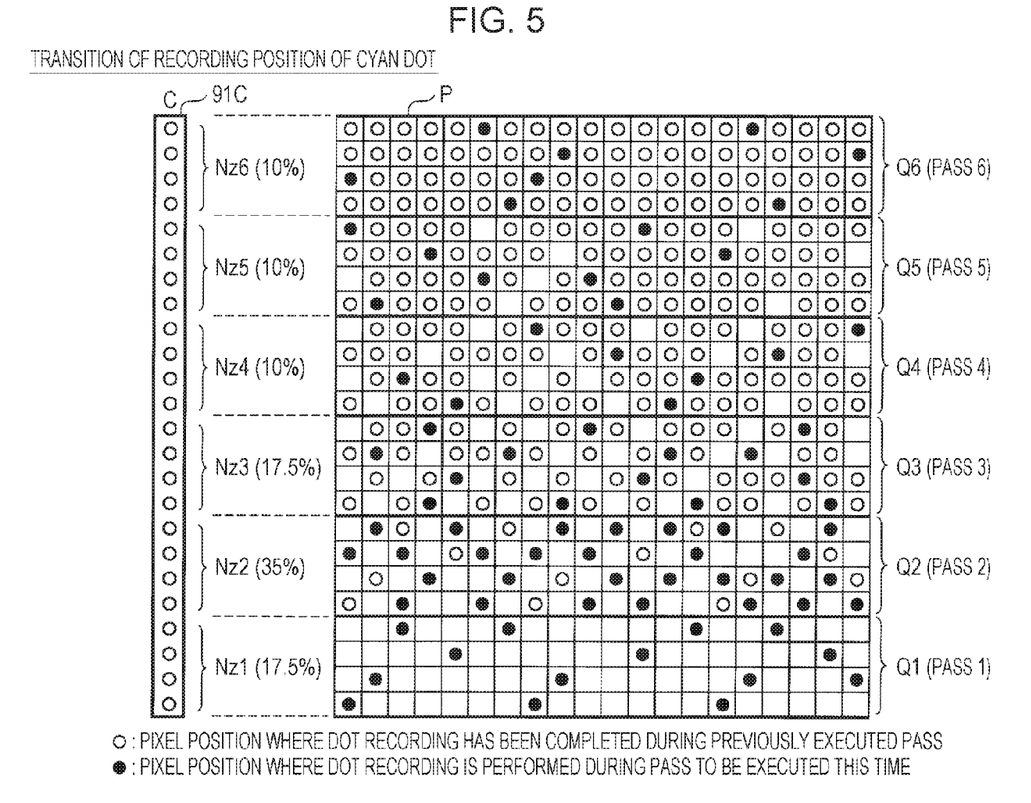
FIG. 5 is an explanatory diagram illustrating a transition of the recording positions of cyan dots.

FIG. 5 illustrates a transition of the recording positions of cyan dots. The values of dot recording ratios of the respective six nozzle groups Nz1 to Nz6 are the same as those for the C ink shown in FIG. 4. Further, the correspondences with the band areas Q1 to Q6 shown in FIG. 3 are illustrated at the right-hand side of FIG. 5. That is, FIG. 5 illustrates a state of executions of dot recording at the time of PASS n+6 shown in FIG. 3. Each of grid-like frames shown in FIG. 5 indicates a pixel position, and further, a white circle indicates a pixel position on which dot recording has been completed during any one of at least one previously executed pass; while a black circle indicates a pixel position on which dot recording is performed during a pass to be executed this time. For example, in the band area Q1 that is located in a bottom portion, any dot recording has not been performed during any one of previous passes, and during a pass to be executed this time, dot recording is performed on each of main scanning lines at a dot recording ratio of 17.5%. In the band area Q2 that is located in a second portion from the bottom portion, a pixel position on which dot recording has been performed during any one of at least one previously executed pass (that is, a pixel position on which dot recording has been performed by the 1st nozzle group Nz1) is denoted by the white circle, and a pixel position on which dot recording is performed during a pass to be executed this time is denoted by the black circle. In this case, a proportion of pixel positions denoted by the black circles is 35% of all pixel positions within the band area Q2. Similarly, every time a pass proceeds, dot recording is performed as shown in each of the band areas Q3, Q4, Q5, and Q6, and dot recording on all pixel positions is completed in the band area Q6 located in the top portion. As understood from this figure, with respect to the C ink, in three passes 1 to 3 constituting the first half of the six passes, a larger number of pixel positions become targets of the dot recording, as compared with in three passes 4 to 6 constituting the second half of the six passes. In addition, dot recording ratios regarding all main scanning lines within one band area are not necessarily the same and a dot recording ratio regarding one of main scanning lines within one band area may be different from a dot recording ratio regarding another one of the main scanning lines within the same band area, but, nevertheless, it is preferable that the dot recording ratios regarding all main scanning lines within one band area are the same.

Figure 6:
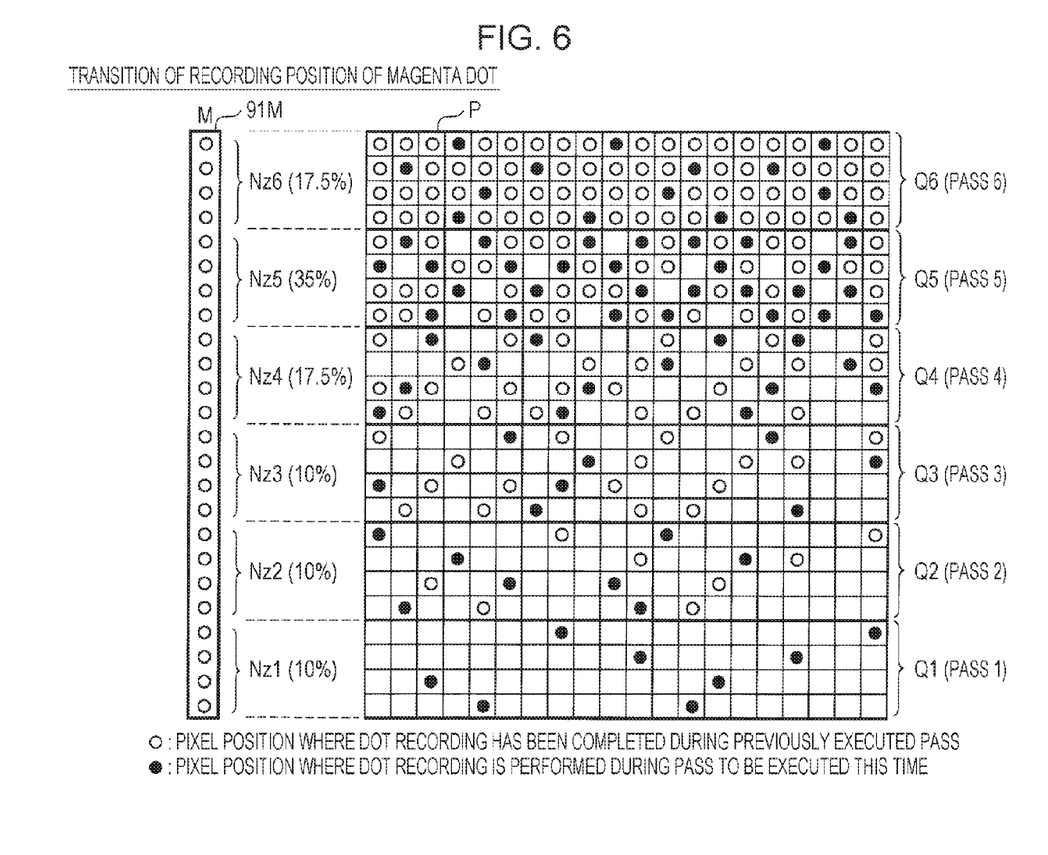
FIG. 6 is an explanatory diagram illustrating a transition of the recording positions of magenta dots.

FIG. 6 illustrates a transition of the recording positions of magenta dots. The values of dot recording ratios of the respective six nozzle groups Nz1 to Nz6 are the same as those for the M ink shown in FIG. 4. As understood from this figure, with respect to the M ink, in the three passes 4 to 6 constituting the second half, a larger number of pixel positions become targets of the dot recording, as compared with in the three passes 1 to 3 constituting the first half.

As shown in FIG. 4, a dot recording ratio regarding each of the N nozzle groups Nz1 to Nz6 (N being a total pass number and being equal to "6" in this case) which are included in one nozzle row 91 (one nozzle set) is a fixed value, and further, all of the dot recording ratios of the respective N nozzle groups Nz1 to Nz6 are not the same, but are each set to a corresponding one of values among which a plurality of differences exist. In the example shown in FIG. 4, three kinds of mutually different dot recording ratios are assigned to the six nozzle groups Nz1 to Nz6 of one nozzle row 91 corresponding to each of the four kinds of inks, but at least two kinds of mutually different dot recording ratios may be assigned to the six nozzle groups Nz1 to Nz6. In other words, each of N fixed values among which at least one difference exists is assigned to a corresponding one of the nozzle groups Nz1 to Nz6 of one nozzle row 91 corresponding to each of the four kinds of inks. Further, it is preferable that, as shown in the example of FIG. 4, the distribution of dot recording ratios across one nozzle row 91 has a convex shape having a single peak. In addition, the values of N dot recording ratios of the respective N nozzle groups Nz1 to Nz6 become also the values of dot recording ratios of the respective N main scan passes on each of the band areas (for example, the band area Q6).

By the way, in the bidirectional recording operation, odd number-th passes are passes for outward paths, and even number-th passes are passes for return paths. Thus, as shown at the right-hand side of FIG. 4, passes 1, 3, and 5 are passes for outward paths, and passes 2, 4, and 6 are passes for return paths. When it is assumed that the recording head 90 moves in a direction toward the right-hand side of FIG. 2, during each of the passes 1, 3, and 5, the inks are ejected onto the recording medium P in order of the Y, M, C, and K; while, during each of the passes 2, 4, and 6, the inks are ejected onto the recording medium P in order reverse to the above order, that is, in order of the K, C, M, and Y.

It is inferred that the color unevenness that occurs due to the change of ejection order of inks is significantly influenced by the ejection order of a plurality of chromatic colors, and in particular, the color unevenness is most significantly influenced by the ejection order of two kinds of inks, that is, the C ink and the M ink. In the example shown in FIG. 4, with respect to the C ink, the total ratio of dot recording ratios of the respective three passes 1 to 3 constituting the first half of the six passes is large; while in contrast, with respect to the M ink, the total ratio of dot recording ratios of the respective three passes 4 to 6 constituting the second half of the six passes is large. Thus, in one band area (for example, the band area Q6), with respect to the C ink and the M ink, dots corresponding to the C ink are mainly subjected to dot recording during the three passes constituting the first half of the six passes, and dots corresponding to the M ink are mainly subjected to dot recording during the three passes constituting the second half of the six passes. Accordingly, even though the bidirectional printing is performed and there is a difference in the ejection order of the inks between the outward path and the return path, it is possible to reduce the influence due to the difference and thereby mitigate the degree of the color unevenness. In addition, when the distributions of the dot recording ratios regarding the C ink and the M ink are mutually reversely set, it is also possible to obtain the same advantageous effect.

As described above, in this first embodiment, with respect to each of the C ink and the M ink among the chromatic inks, the value of the dot recording ratio of each of the N scan passes is set to a corresponding one of N fixed values among which at least one difference exists, and the N dot recording ratios regarding the C ink and the N dot recording ratios regarding the M ink are set such that the arrangement order of the N dot recording ratios regarding the C ink and the arrangement order of the N dot recording ratios regarding the M ink become different from each other. More specifically, for the passes 1 to 3 that are N/2 of the N main scan passes and that constitute the first half, the total ratio of the dot recording ratios regarding the C ink is set so as to become larger than the total ratio of the dot recording ratios regarding the M ink. In contrast thereto, for the passes 4 to 6 that are N/2 of the N main scan passes and that constitute the second half, the total ratio of the dot recording ratios regarding the M ink is set so as to become larger than the total ratio of the dot recording ratios regarding the C ink. Accordingly, even though, in the bidirectional printing, two kinds of order of ejections of inks onto the recording medium P are reverse to each other, the color unevenness due to the reverse in the ejection order of inks is mitigated to a greater degree, as compared with existing methods. In addition, when an operator representing an operation of converting any number X into an integer is defined as INT (X), in the case where the total pass number N in the multi-pass recording is an odd number, the value of the above "N/2" becomes a value given by INT (N/2). This operator INT (X) is a well-known operation of converting any number X into an integer by truncating numbers after the decimal point of the number X.

Further, in the example shown in FIG. 4, the arrangement order of dot recording ratios regarding the Y ink is also set so as to be different from the arrangement order of dot recording ratios regarding each of the C ink and the M ink. More specifically, for the Y ink, the dot recording ratio is large particularly in the pass 3. The Y ink influences the color unevenness to a smaller degree, as compared with the C ink and the M ink, but there is a possibility in that the degree of the color unevenness can be further reduced by setting a dot recording ratio regarding the Y ink to a large value in a pass different from passes in each of which the value of a dot recording ratio regarding a corresponding one of the C ink and the M ink is set to a large value. In the example shown in FIG. 4, in a firstly-executed scan pass group constituted of passes 1 and 2 that are 1/3 of the N main scan passes, the total ratio of dot recording ratios regarding the C ink is larger than any one of the total ratio of dot recording ratios regarding the M ink and the total ratio of dot recording ratios regarding the Y ink. Further, in a secondly-executed scan pass group constituted of passes 3 and 4 that are 1/3 of the N main scan passes, the total ratio of dot recording ratios regarding the Y ink is larger than any one of the total ratio of dot recording ratios regarding the C ink and the total ratio of dot recording ratios regarding the M ink. Further, in a thirdly-executed scan pass group constituted of passes 5 and 6 that are 1/3 of the N main scan passes, the total ratio of dot recording ratios regarding the M ink is larger than any one of the total ratio of dot recording ratios regarding the C ink and the total ratio of dot recording ratios regarding the Y ink. In this way, for each of the three chromatic colors, a main scan pass corresponding to a dot recording ratio having a large value is assigned to a main scan pass whose pass number is different from that of any other one of the three chromatic colors. In addition, it is optionally determined for each of the chromatic colors C, M, and Y to which of the main scan passes a dot recording ratio having a large value is assigned. In this regard, however, preferably, with respect to the C ink, a dot recording ratio having a large value is not assigned to the secondly-executed main scan group, but is assigned to one of the firstly-executed main scan pass group and the thirdly-executed main scan pass group, and with respect to the M ink, a dot recording ratio having a large value is not assigned to the secondly-executed main scan group, but is assigned to the other one of the firstly-executed main scan pass group and the thirdly-executed main scan pass group. In addition, when the total pass number N in the multi-pass recording cannot be divided by "3", through the use of the above operator INT (X), first INT (N/3) ones of the N main scan passes are called the "firstly-executed main scan pass group"; last INT (N/3) ones of the N main scan passes are called the "thirdly-executed main scan pass group"; and main scan passes between the above both main scan pass groups are called the "secondly-executed main scan pass group".

It can be understood from the above description that the setting of dot recording ratios, shown in FIG. 4, has the following features.

Feature 1

In the first half of the N main scan passes, which is constituted of N/2 of the N main scan passes, the total ratio of dot recording ratios regarding the C ink is larger than the total ratio of dot recording ratios regarding the M ink, and in the second half of the N main scan passes, which is constituted of N/2 of the N main scan passes, the total ratio of dot recording ratios regarding the M ink is larger than the total ratio of dot recording ratios regarding the C ink.

Feature 2

For each of a plurality of kinds of inks (particularly, for each of the M ink and the C ink), the value of the dot recording ratio of each of the N main scan passes is set to a corresponding one of N fixed values among which at least one difference exists, and the arrangement order of dot recording ratios regarding the relevant kind of ink is set so as to become different from the arrangement order of dot recording ratios regarding any other one of the plurality of kinds of inks.

Feature 3

With respect to the N main scan passes, in the firstly-executed main scan group, the total ratio of dot recording ratios regarding the C ink is larger than any one of the total ratio of dot recording ratios regarding the M ink and the total ratio of dot recording ratios regarding the Y ink; in the secondly-executed main scan group, the total ratio of dot recording ratios regarding the Y ink is larger than any one of the total ratio of dot recording ratios regarding the C ink and the total ratio of dot recording ratios regarding the M ink; and in the thirdly-executed main scan group, the total ratio of dot recording ratios regarding the M ink is larger than any one of the total ratio of dot recording ratios regarding the C ink and the total ration of dot recording ratios regarding the Y ink.

Feature 4

The distribution of dot recording ratios across the N main scan passes has a convex shape having a single peak.

Feature 5

The positions of the peaks in the distributions of dot recording ratios regarding the four kinds of inks K, C, M, and Y are different from one another.

In addition, part of the above features can be omitted, but it is preferable to provide at least feature 1. Further, in feature 5, it is also possible to set both of the positions of the peaks in the distributions of dot recording ratios regarding the M ink and the C to the first half of the N main scan passes, which is constituted of 1/2 of the N main scan passes. Specifically, the position of the peak in the distribution of dot recording ratios regarding the M ink may be set to the pass 1, and the position of the peak in the distribution of dot recording ratios regarding the C ink may be set to the pass 3. In this case, it is also possible to mitigate the degree of the color unevenness due to a difference in the ejection order of inks, provided that there exists a difference in the arrangement order of dot recording ratios (i.e., the distribution of dot recording ratios) between the M ink and the C ink.

As described above, in this first embodiment, in the first half of the N main scan passes, with respect to the plurality of kinds of inks, the total ratio regarding the first recording ratio is set so as to become larger than the total ratio regarding the second recording ratio, and further, in the second half of the N main scan passes, with respect to the plurality of kind of inks, the total ratio regarding the second recording ratio is set so as to become larger than the total ratio regarding the first recording ratio, thus making it possible to, even when the ejection order of the inks is changed, suppress the occurrence of the color unevenness due to the change of the ejection order of the inks.

B. Second Embodiment

Figure 7:
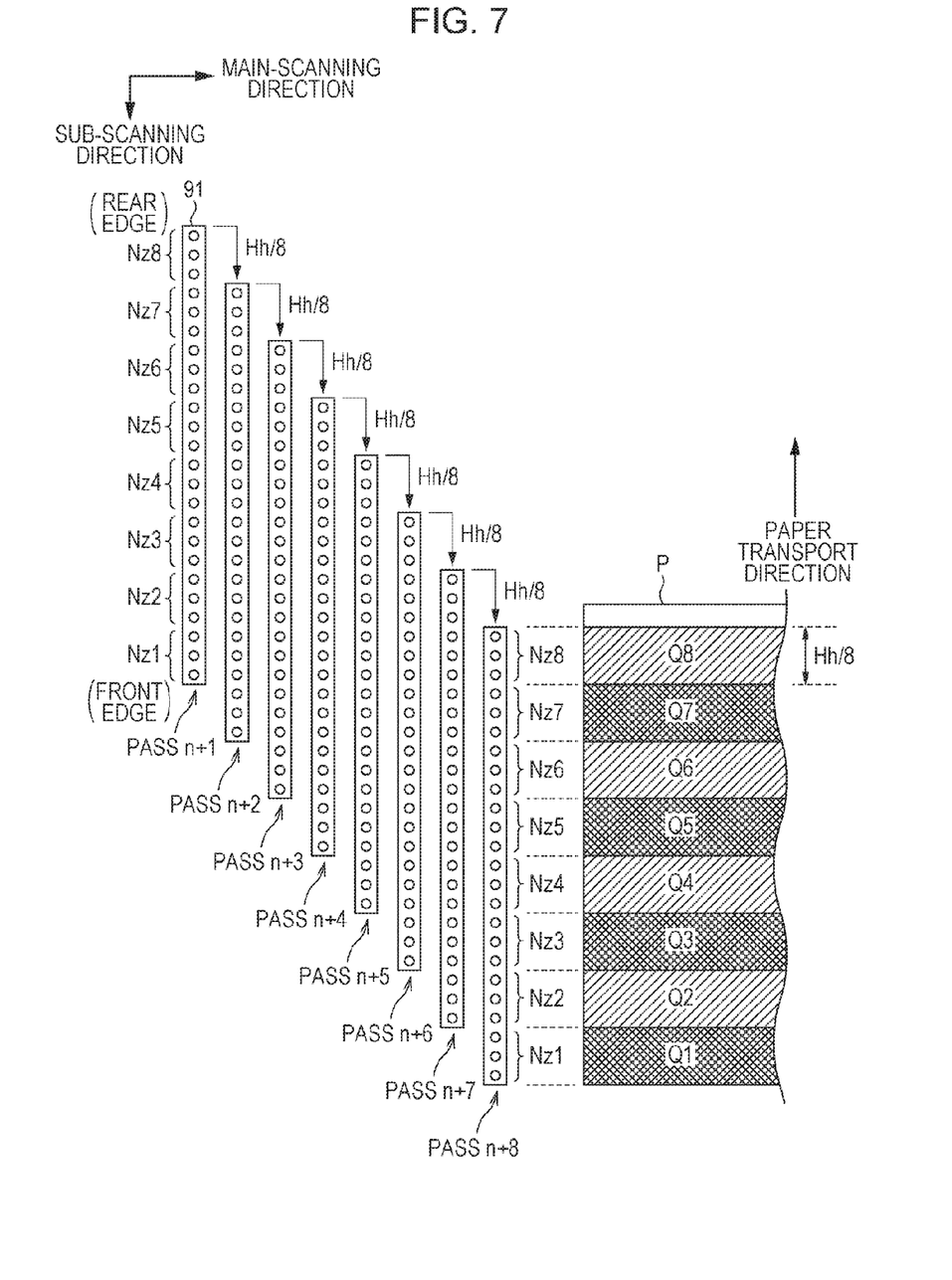
FIG. 7 is an explanatory diagram illustrating the states of main scan passes in a second embodiment of the invention.

FIG. 7 is an explanatory diagram illustrating the states of main scan passes in this second embodiment. A nozzle row 91 shown in FIG. 7 is the same as that shown in each of FIGS. 2 and 3, and here, a total pass number N in the multi-pass recording is "8", and thus, a plurality of nozzles contained in the nozzle row 91 are divided into "8" nozzle groups Nz1 to Nz8. Further, a paper transport amount in a sub-scanning operation that is performed every time one pass is completed is Hh/8, and the width of each of the band areas Q1 to Q8 is also Hh/8.

Figure 8:
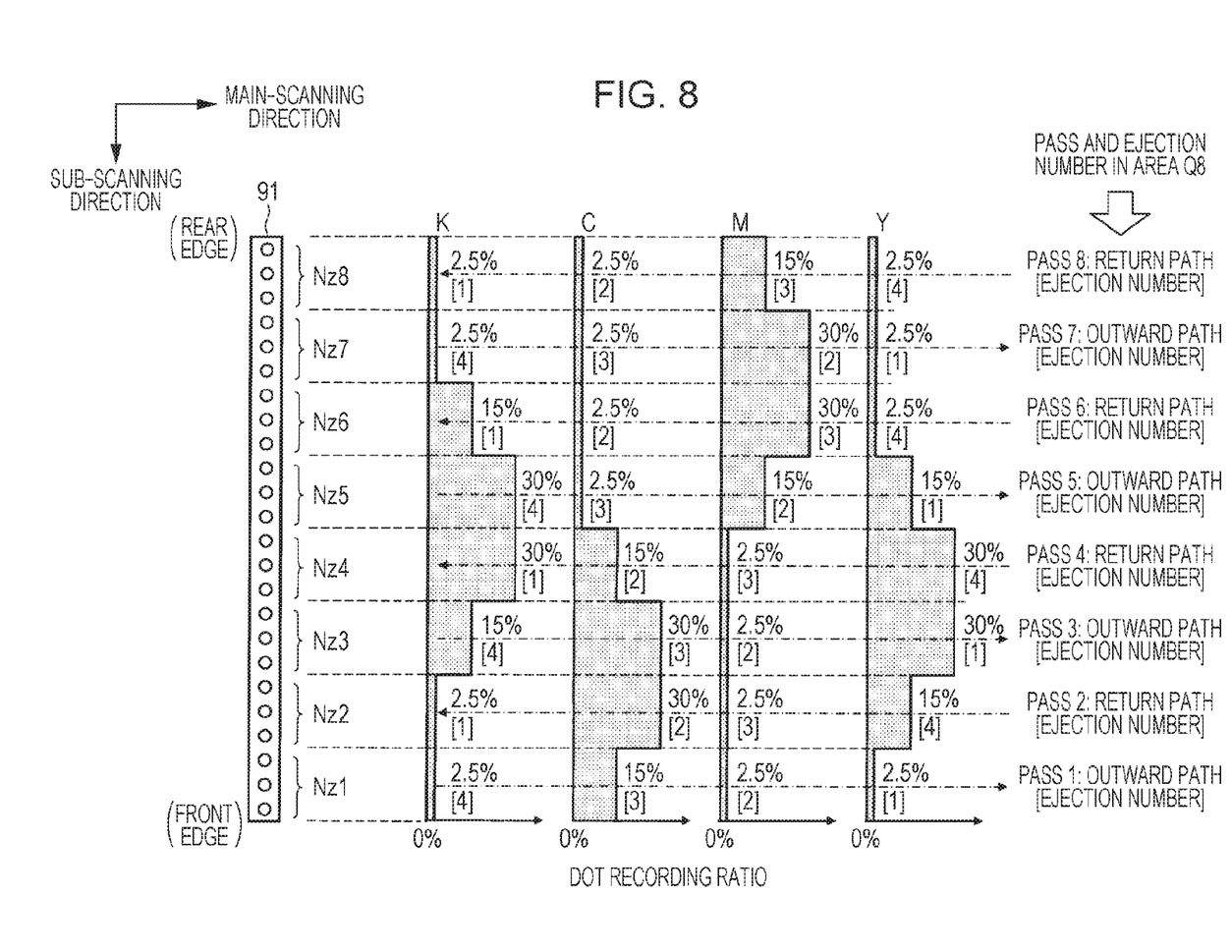
FIG. 8 is an explanatory diagram illustrating dot recording ratios that are set to nozzle rows each associated with a corresponding one of inks in a second embodiment of the invention.

FIG. 8 is an explanatory diagram illustrating dot recording ratios that are set to nozzle rows each associated with a corresponding one of four kinds of inks, and is a diagram corresponding to the diagram shown FIG. 4 in the first embodiment. A method of assigning dot recording ratios in this second embodiment also has features 1 to 5, and thus, in this respect, the method is common to the aforementioned method in the first embodiment. In this regard, however, in an example shown in FIG. 8, "the first half of the N main scan passes" in feature 1 corresponds to passes 1 to 4, and "the second half of the N main scan passes" in feature 2 corresponds to passes 5 to 8. Further, in the example shown in FIG. 8, "the firstly-executed main scan pass group" in feature 3 corresponds to passes 1 and 2; "the secondly-executed scan pass group" in feature 3 corresponds to passes 3 to 6; and "the thirdly-executed main scan pass group" in feature 3 corresponds to passes 7 and 8.

In this second embodiment, like the first embodiment, it is possible to, even when the ejection order of a plurality of kinds of inks is changed, suppress the occurrence of color unevenness due to the change of the ejection order of the plurality of kinds of inks.

Figure 9:
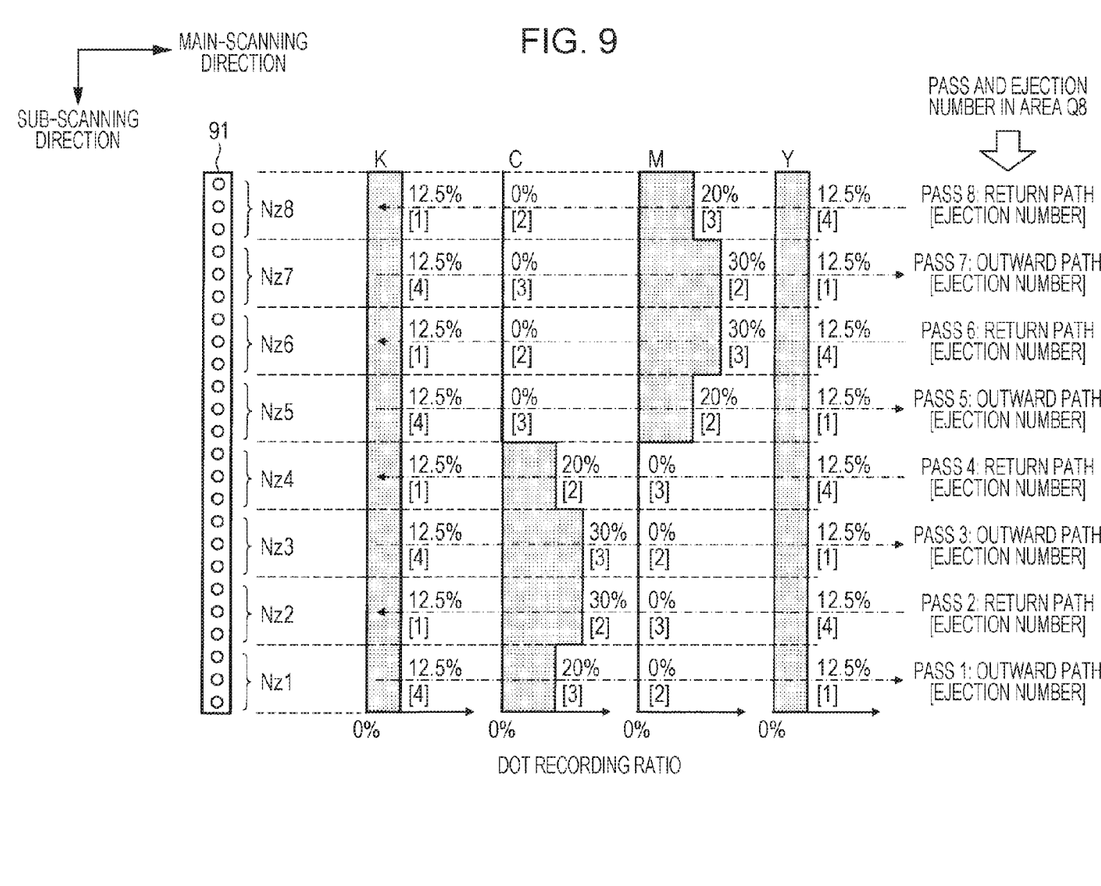
FIG. 9 is an explanatory diagram illustrating dot recording ratios that are set to nozzle rows each associated with a corresponding one of inks in a modification example of a second embodiment of the invention.

FIG. 9 illustrates a modification example of FIG. 8 in this second example. Here, it is largely different from FIG. 8 that, for each of the K ink and the Y ink, dot recording ratios of the respective N main scan passes are set to the same constant value (12.5%). Further, with respect to the C ink, the total ratio of dot recording ratios of the respective passes 1 to 4 constituting the first half reaches 100, and any dot recording is not performed in passes 5 to 8 constituting the second half. Meanwhile, with respect to the M ink, contrary to the C ink, any dot recording is not performed in the passes 1 to 4 constituting the first half, and the total ratio of dot recording ratios of only the respective passes 5 to 8 constituting the second half reaches 100%. With respect to feature 1 to 5, this modification example has features 1, 2, and 4, but does not have features 3 and 5. Further, it can be understood that features 2 and 4 do not necessarily apply to all of the four kinds of inks, but are sufficient provided that features 2 and 4 apply to at least two of the four kinds of inks.

Modification Examples

It is to be noted that the invention is not limited to the aforementioned practice examples and embodiments, and can be practiced in various forms and configurations within the scope not departing from the gist of the invention. Further, for example, the following modifications can be also made.

Modification Example 1

In the aforementioned embodiments, the plurality of nozzles belonging to each of the plurality of nozzle groups (for example, the nozzle groups Nz1 to Nz6 shown in FIG. 4) are supposed to have the same dot recording ratio, but a plurality of kinds of mutually different ratios may be set to the plurality of nozzles belonging to the same nozzle group. In this case, it is preferable that the average value of dot recording ratios of the respective plurality of nozzles belonging to the same nozzle group is set so as to have at least part of features 1 to 5 having been described in the above embodiments.

Modification Example 2

In the aforementioned embodiments, two cases in which the total pass number N is "6" and the total pass number N is "8" have been described, but any integer of 2 or more can be used as the total number N. Further, as far as the total ratio of dot recording ratios on the main scanning lines each associated with a corresponding one of the N main scan passes is made 100%, it is possible to set the dot recording ratio in each of the N main scan passes to any value.

Modification Example 3

As kinds of inks, in addition to the above inks K, C, M, and Y, one or more other inks can be used; and alternatively, in substitution for part of or all of the above inks K, C, M, and Y, one or more other inks can be used. Features 1 to 5 are features that are brought about by the improvements, shown in FIGS. 4, 8, and 9, which, in order to suppress the occurrence of color unevenness due to a difference in the ejection order of mainly two kinds of inks, that is, the C and M inks, or three kinds of inks, that is, the C, M, and Y inks, have been performed on the distribution of dot recording ratios regarding the inks. In this regard, however, without being limited to the above inks, two or more kinds of inks may be selected from among a plurality of kinds of inks, and the aforementioned improvements may be performed on the selected two or more kinds of inks such that part of or all of features 1 to 5 are brought about.

Modification Example 4

In the aforementioned embodiments, a configuration in which the recording head moves in the main scanning direction has been described, but the invention is not limited to this configuration, provided that inks can be ejected while causing a recording head and a recording medium to move relatively to each other. For example, the recording medium may be moved in the main-scanning direction in a state in which the recording head remains stationary, or both of the recording medium and the recording head may be moved in the main-scanning direction. In addition, in the sub-scanning direction, a configuration in which the recording medium and the recording head are movable relatively to each other may be also employed. For example, a configuration in which, like a flat-bed type printer, recording is performed onto a recording medium mounted on (fixed to) a table while causing a head portion to move in an XY direction may be employed. That is, a configuration in which the recording medium and the recording head are movable relatively to each other in at least one of the main-scanning direction and the sub-scanning direction may be employed.

Modification Example 5

In the aforementioned embodiments, a printing apparatus that ejects inks onto printing paper has been described, but the invention can be applied to various dot recording apparatuses other than the printing apparatus, and can be also applied to, for example, an apparatus that forms dots on a substrate by ejecting liquid droplets onto the substrate. Moreover, a liquid ejecting apparatus that ejects or discharges liquids other than the inks may be employed, and the invention can be also applied to various liquid ejecting apparatuses provided with a liquid ejecting head that ejects a slight amount of liquid droplets. In addition, the liquid droplet means a shape state of a liquid ejected from the liquid ejecting apparatus, and encompasses a granular shape, a teardrop shape, and a shape having a thread-shaped tail. Further, as the liquid mentioned here, any material that is able to be ejected by the liquid ejecting is sufficient. As the liquid, any liquid substance as a substance's liquid-phase state is sufficient, and well-known examples of the liquid includes a liquid substance as a substance's liquid state having high or low viscosity, and a liquid substance as a substance's fluid state, such as sol, gel water, an inorganic solvent other than the sol and the gel water, an organic solvent, solution, a liquid resin, and a liquid metal (metallic melt). Further, well-known examples of the liquid includes not only such a liquid substance as a substance's one state, but also includes a liquid substance in which particles of a functional material formed of solids, such as pigments or metallic particles, are dissolved, dispersed, or mixed in a solvent. Further, as typical examples of the liquid, ink such as described in the above embodiments, liquid crystal, and the like can be provided. Here, the ink encompasses general water-based ink and oil-based ink, and various liquid compositions, such as gel ink and hot-melt ink. As a specific example of the liquid ejecting apparatus, there can be provided a liquid ejecting apparatus configured to eject liquid that includes a material, such as an electrode material or a coloring material for use in, for example, manufacturing of a liquid crystal display, an electroluminescence (EL) display, a surface emission display, or a color filter, and that includes the material in the form of dispersion or dissolution. Further, as specific examples of the liquid ejecting apparatus, there can be also provided a liquid ejecting apparatus configured to eject a biological organic substance for use in manufacturing of a biochip; a liquid ejecting apparatus configured to eject liquid that is used as a precision pipette and that becomes a sample; a textile printing device; a micro-dispenser, and the like. Moreover, as specific examples of the liquid ejecting apparatus, there can be also provided a liquid ejecting apparatus configured to eject a lubricant to a precision machine, such as a watch or a camera, in a pinpoint manner; a liquid ejecting apparatus configured to eject a transparent resin liquid, such as a liquid including a ultraviolet curable resin, onto a substrate in order to form a micro hemispherical lens (optical lens) for use in optical communication elements or the like; and a liquid ejecting apparatus configured to eject an etching liquid, such as an acid or an alkali, in order to perform etching of a substrate or the like.

Hereinbefore, embodiments of the invention have been described on the basis of some practice examples, but the aforementioned embodiments of the invention are just for use in making it easy to understand the invention, and do not limit the invention. The invention can be modified or improved as far as not departing from the gist of the invention and the scope of appended claims, and naturally, its equivalents are included in the invention.

This application claims priority to Japanese Patent Application No. 2015-065920 filed on Mar. 27, 2015. The entire disclosure of Japanese Patent Application No. 2015-065920 is hereby incorporated herein by reference.

What is claimed is:

1. A liquid droplet ejecting apparatus comprising:
a recording head that includes a first nozzle set through which a first liquid is ejected onto a dot recording medium, and a second nozzle set through which a second liquid different from the first liquid is ejected onto the dot recording medium;

a scanning driving portion that performs bidirectional scanning for an outward path and a return path by moving at least one of the dot recording medium and the recording head; and a control portion that controls the scanning driving portion and the recording head, wherein the control portion executes multi-pass recording that completes dot recording on each of a plurality of scanning lines by executing N scan passes including a scan pass for the outward path and a scan pass for the return path (N being an integer of 2 or more), and when a proportion of executions of dot recording using the first liquid in each of the N scan passes is made a first recording ratio, and a proportion of executions of dot recording using the second liquid in each of the N scan passes is made a second recording ratio, the control portion sets the first recording ratio and the second recording ratio such that, in a first half of the N scan passes, a total ratio of the first recording ratio is larger than a total ratio of the second recording ratio, and in a second half of the N scan passes, a total ratio of the second recording ratio is larger than a total ratio of the first recording ratio.

2. The liquid droplet ejecting apparatus according to claim 1, wherein the control portion sets a value of the first recording ratio of each of the N scan passes to a corresponding one of N first fixed values among which at least one difference exists, and sets a value of the second recording ratio of each of the N scan passes to a corresponding one of N second fixed values among which at least one difference exists.

3. The liquid droplet ejecting apparatus according to claim 2, wherein the N is an integer of 3 or more, the recording head further includes a third nozzle set through which a third liquid different from the first liquid and the second liquid is ejected onto the dot recording medium, when a proportion of executions of dot recording using the third liquid in each of the N scan passes is made a third recording ratio, the control portion sets a value of the third recording ratio of each of the N scan passes to a corresponding one of N third fixed values among which at least one difference exists, and when the N scan passes performed by the recording head is time-serially divided into a firstly-executed scan pass group, a secondly-executed scan pass group, and a thirdly-executed scan pass group, the control portion sets the first recording ratio, the second recording ratio, and the third recording ratio such that, in the firstly-executed scan pass group, a total ratio of the first recording ratio is larger than any one of a total ratio of the second recording ratio and a total ratio of the third recording ratio, in the secondly-executed scan pass group, a total ratio of the third recording ratio is larger than any one of a total ratio of the first recording ratio and a total ratio of the second recording ratio, and in the thirdly-executed scan pass group, a total ratio of the second recording ratio is larger than any one of a total ratio of the first recording ratio and a total ratio of the third recording ratio.

4. The liquid droplet ejecting apparatus according to claim 3, wherein the first liquid and the second liquid correspond to a cyan ink and a magenta ink, respectively, or correspond to a magenta ink and a cyan ink, respectively, and the third liquid corresponds to a yellow ink.

5. A liquid droplet ejecting method using a recording head including a first nozzle set through which a first liquid is ejected onto a dot recording medium and a second nozzle set through which a second liquid different from the first liquid is ejected onto the dot recording medium, the liquid droplet ejecting method comprising:

executing multi-pass recording that completes dot recording on each of a plurality of scanning lines by executing N scan passes including a scan pass for an outward path and a scan pass for a return path (N being an integer of 2 or more), and wherein, when a proportion of executions of dot recording using the first liquid in each of the N scan passes is made a first recording ratio, and a proportion of executions of dot recording using the second liquid in each of the N scan passes is made a second recording ratio, the first recording ratio and the second recording ratio are set such that, in a first half of the N scan passes, a total ratio of the first recording ratio is larger than a total ratio of the second recording ratio, and in a second half of the N scan passes, a total ratio of the second recording ratio is larger than a total ratio of the first recording ratio.

* * * * *